Sept. 20, 1938.  R. S. SANFORD  2,131,014
AUTOMATIC SHOCK ABSORBER ADJUSTING MECHANISM
Filed Oct. 29, 1932   2 Sheets-Sheet 1
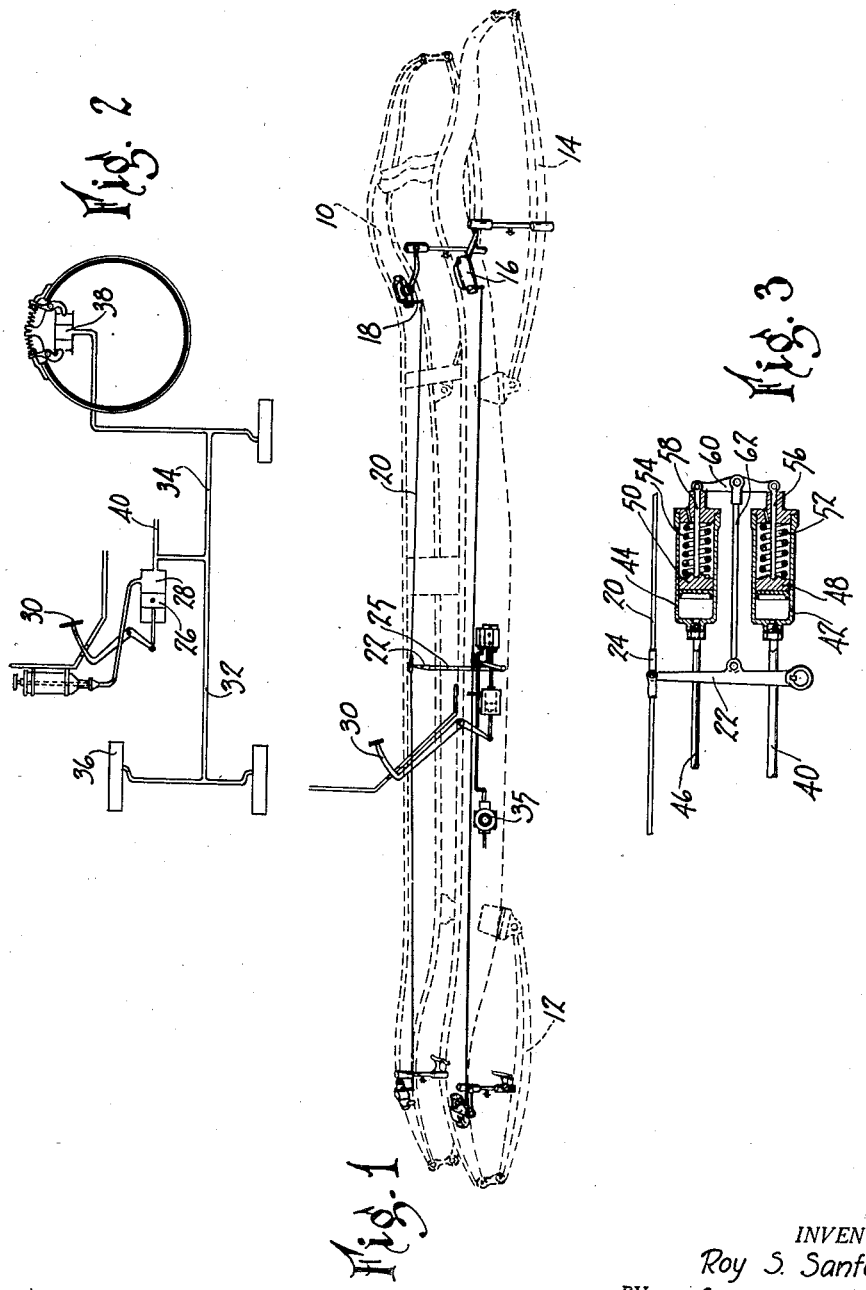
INVENTOR.
Roy S. Sanford
BY Jerome R. Cox
ATTORNEY.

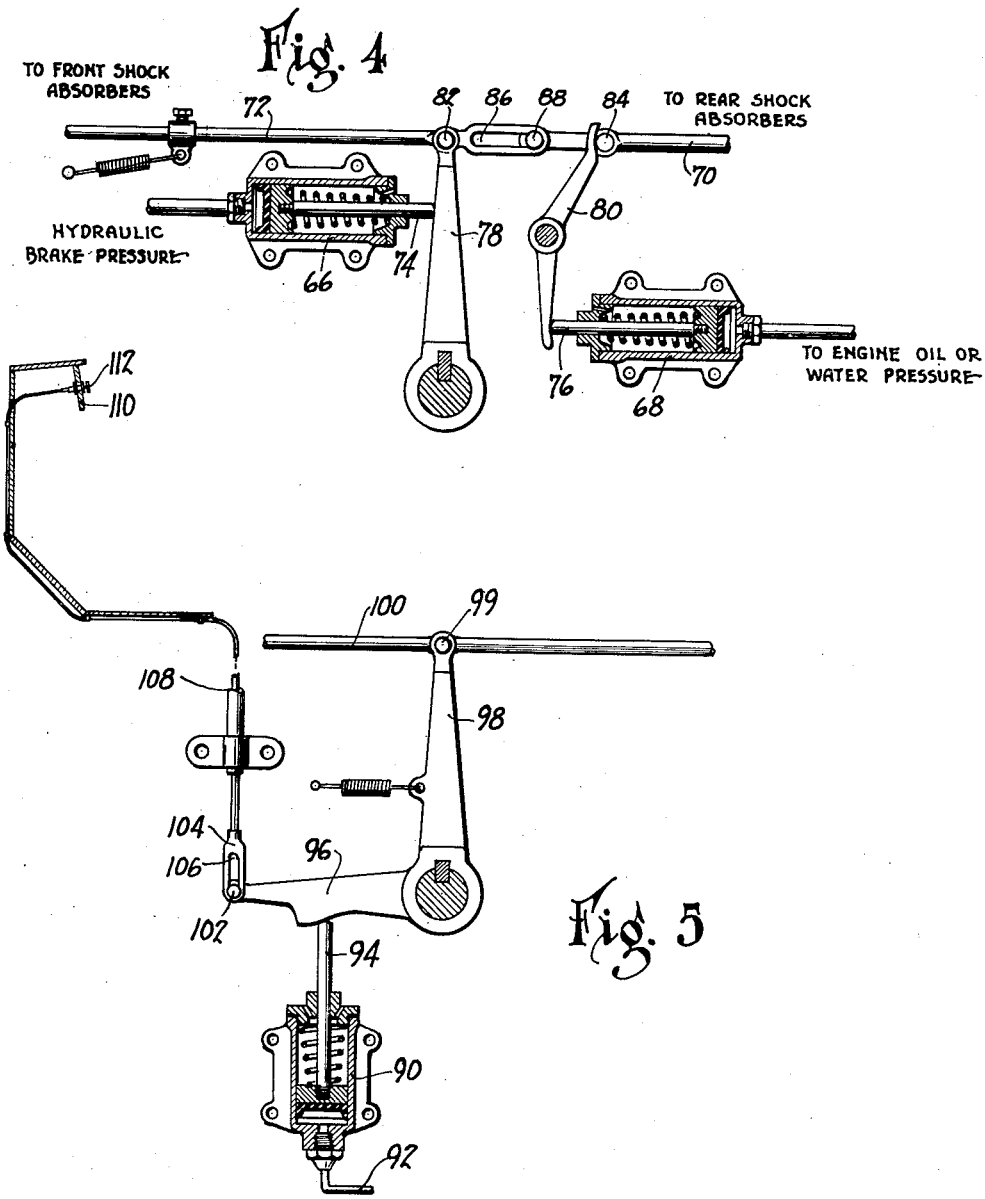

Patented Sept. 20, 1938

2,131,014

UNITED STATES PATENT OFFICE 2,131,014

AUTOMATIC SHOCK ABSORBER ADJUSTING MECHANISM

Roy S. Sanford, South Bend, Ind., assignor to Bendix Aviation Corporation, South Bend, Ind., a corporation of Delaware Application October 29, 1932, Serial No. 640,313

23 Claims. (Cl. 188—2)

This invention relates to automotive vehicles and has particular reference to the securement of more consistently satisfactory spring action during the operation thereof.

An object of the invention is to improve the riding qualities of automotive vehicles utilizing shock absorbers of any conventional type, the only limitation upon such conventional shock absorber being that some means be provided in conjunction with each absorber for altering the resistance imposed by the mechanism to shock movement transferred thereto. A number of varying types are utilized as standard equipment by the automotive vehicle manufacturers. Some of these are hydraulically operated and some impose resistance to check the rebound of the car by other means. In each of them, however, adjusting mechanism is provided whereby the shock resistance of the absorber may be stiffened within certain limits to take care of different riding conditions.

A more specific object of the invention is to control the shock resistance of such absorbers automatically under varying conditions. In the application of four wheel brakes to a moving vehicle, the normal tendency of the vehicle is to pitch forward in what is commonly known as a "ducking" movement. This is caused by the transmission of the retarding action through the springs to the vehicle itself, the tendency of the vehicle, due to its momentum, naturally being to continue forward. The forward movement is checked by the springs and the absorber mechanism associated therewith. The invention to be described and illustrated eliminates this ducking action by automatically stiffening shock resistance of the absorber mechanisms associated with the front wheel springs when the brakes are applied and in proportion to the power with which they are applied.

A further object of the invention is to automatically stiffen the shock resistance of both front and rear absorbers when the vehicle is travelling at high speed. It is well known that high speed travel is rendered more comfortable and less hazardous by stiffening the shock resistance of the absorbers. On the other hand, where the speed of travel is slow it is usually desirable to soften the spring action of the vehicle to produce maximum riding ease.

Various other objects and meritorious features of the invention will be apparent from the following description taken in conjunction with the drawings wherein:

Fig. 1 illustrates diagrammatically an improved assembly incorporating my invention, Fig. 2 illustrates a conventional hydraulic brake system operable to control the shock resistance of the absorbers, Fig. 3 illustrates one form of mechanism operable to control the shock resistance of the absorbers automatically in accordance with either the power of the brake application or the speed of the vehicle, Fig. 4 is a modified structure whereby the front absorbers only are stiffened on application of the brakes, and Fig. 5 illustrates a somewhat modified structure incorporating a manual control.

Referring now to the diagrammatic illustration on Fig. 1, the numeral 10 represents the usual automotive vehicle frame supported in the customary manner by front and rear springs 12 and 14 respectively. Shock absorbing mechanism 16 has been illustrated in conjunction with each of the four springs and each of these absorber mechanisms includes an arm 18 whereby the shock resistance of the mechanism may be stiffened or softened in accordance with the direction of its movement. As is well known, the hydraulic type of absorber customarily provides means for limiting the size of the fluid passage between the intake and exhaust cylinders. On such types of mechanism the arm 18 is operative to vary the size of this passage.

Extending between the actuating arms 18 of the right absorber mechanisms and the left absorber mechanisms, respectively, are operating rods 20 which are actuated by means of pivoted arms 22 connected thereto by means of a sleeve 24. These actuating arms 22 may be secured to a cross shaft 25 rotatably journalled in the frame of the vehicle.

In Figs. 1, 2, and 3 the improved structure of the invention is utilized in conjunction with a conventional hydraulic brake assembly wherein the piston 26 of the master fluid cylinder 28 is actuated by brake pedal 30 to force fluid through the lines 32 and 34 to the front and rear brake shoe actuating cylinders 36 and 38 respectively. A branch fluid line 40 is associated with the master cylinder (Fig. 2) which communicates with the interior of a fixed fluid cylinder 42. A second fluid cylinder 44 is fixedly positioned in any suitable manner adjacent the stationary cylinder 42 and a fluid line 46 communicates with the interior thereof, this fluid line extending from any fluid pressure creating mechanism associated with the vehicle. Such mechanism may be the oil pressure pump associated with the lubricating mechanism or the water pump associated with the cooling mechanism of the engine.

Within the cylinders 42 and 44 are pistons 48 and 50 operable by fluid pressure against the resistance of springs 52 and 54. Piston stems 56 and 58 are connected with the pistons respectively and extend through their respective cylinder casings, the extremity of each being pivotally connected to opposed ends of a cross lever 60, which cross lever is pivotally connected at substantially its midpoint by rod 62 with one of the actuating arms 22.

The operation of the structure illustrated in Figs. 1, 2, and 3 will be apparent from the foregoing description. Upon application of the brakes by manipulation of pedal 30 fluid will be forced from the master cylinder 28 through branch conduit 40 to the fluid cylinder 42. The piston thereof will be actuated against the resistance of spring 52 and the cross lever 60 swung about its pivotal connection with piston stem 58 to actuate the arm 22 through the connecting rod 62. Movement of the said arm 22 will actuate the rods 20 respectively to move the adjusting arms 18 of the shock absorbers to stiffen the shock resistance thereof.

It will be further apparent that as the vehicle attains speed the pressure created by either the engine oil pump or the water circulating pump will increase and this increased pressure will be communicated through conduit 46 to fluid cylinder 44. This produces movement of cross lever 60 about its pivotal connection with piston stem 56 to actuate arm 22 and gradually stiffen the shock resistance of the absorbers with the increase of speed.

A somewhat modified form of structure has been illustrated in Fig. 4 which permits the stiffening of the front absorbers without altering the shock resistance of the rear absorbers. In this construction the cylinder 66 is actuated by the master cylinder of the brake system and the cylinder 68 is actuated by the pressure developed from the pump. A pair of rods 70 are coupled with the rear absorbers and a pair of rods 72 are coupled with the front absorbers. The piston stems 74 and 76 of the respective fluid cylinders are operable to actuate arms 78 and 80 respectively. These arms are coupled by one way connections through cross rods 82 and 84 respectively to actuate the rods 72 and 70.

Each rod 72 includes a slot 86 within which pins 88 at the extremities of rods 70 are slidably engaged. Through this one way connection the brake operated cylinder 66 is operable to actuate the rods 72 without actuating the rods 70 which are connected with the rear shock absorbers. Therefore application of the brakes functions to automatically stiffen the front absorbers only and the ducking action of the vehicle upon severe application of the brakes is substantially eliminated.

When the other fluid cylinder 68 is operated by the increased pressure developed by the increased speed of the engine, the arm 80 actuates both rods 70 and rods 72 to stiffen both the front and rear absorbers, thereby providing maximum controlability in steering the vehicle and insuring maximum roadability.

Fig. 5 illustrates a somewhat modified form wherein manual means for stiffening the check resistance of the absorbers is incorporated with an automatically operable fluid pressure cylinder 90 which communicates with the engine pump or water pump through the fluid line 92. In this structure the piston stem 94 operates one arm 96 of a bell crank, the other arm 98 being connected with a cross rod 99 extending between rods 100 which are connected to the actuating arms 18 of the front and rear shock absorbers. The arm 96 is provided with a pin 102 adjacent its extremity. A link 104 having a slot 106 therein slidably engaging the pin 102 is connected to the flexible cable 108 of a Bowden cable arrangement which is operable from the dash 110 of the vehicle by means of a button 112. It will be apparent that the pin and slot connection 102 and 106 permits actuation of the bell crank to stiffen the check resistance of the shock absorbers by the fluid cylinder 90 without in any way affecting the manual adjusting mechanism. On the other hand, the button 112 may be pulled outwardly from the dash to actuate the bell crank and stiffen the shock absorbers at the will of the driver.

While certain preferred structures have been herein illustrated operable to secure the objects of this invention, various modifications will be apparent to those skilled in the art and for that reason it is intended that the scope of the invention be determined by the claims appended hereto.

What I claim:

1. In mechanism of the class described, brakes, means for applying the brakes, front shock absorbers, rear shock absorbers, means for varying the checking resistance of each set of absorbers, and means coupled with the brake applying means and the check resistance varying means automatically operable on movement of the brake actuating means to increase the checking resistance of the front set of absorbers.

2. In mechanism of the class described, brakes, front shock absorbers, rear shock absorbers, means for varying the checking resistance of each set of absorbers, and means coupled with the brake applying means and the check resistance varying means automatically operable on actuation of the brakes to increase the checking resistance of the front set of absorbers.

3. In combination with an automotive vehicle having front and rear shock absorbers and pressure creating means variable in proportion to the speed of the motor, brakes, a brake operating member coupled therewith, independently operable means for adjusting the shock resistance of the front and rear absorbers respectively, means connecting said brake operating member and the adjusting means for the front absorbers for stiffening the latter upon actuation of said operating means, and means coupled with the adjusting means for both front and rear absorbers operable by said pressure creating means for stiffening both front and rear absorbers as the speed of the vehicle increases.

4. In combination with an automotive vehicle equipped with a hydraulic brake system including a master fluid cylinder and a manual operating member therefor, a shock absorber operatively positioned on the vehicle, means for stiffening said absorber, fluid operated means for actuating said stiffening means, and a fluid line between said master fluid cylinder and the fluid operated actuating means whereby application of the brakes automatically stiffens said absorber.

5. In combination with a motor vehicle having shock absorber mechanism operatively positioned thereon, means for stiffening said absorber mechanism, motor powered mechanism for actuating the stiffening mechanism, and independent means for actuating the stiffening mechanism.

6. In combination with a front and rear pair of shock absorbers, independently operable means for stiffening the shock resistance of each set, means for actuating the front set stiffening means independently, and separate means operable to actuate both stiffening means.

7. In combination with a front and rear pair of shock absorbers, independently operable means for stiffening the shock resistance of each set, manual means for actuating the front set stiffening means independently, and separate means manually operable to actuate both stiffening means.

8. In combination with a motor vehicle having shock absorber mechanism operatively positioned thereon, means for stiffening said absorber mechanism, motor powered mechanism for actuating the stiffening mechanism, and manually operated independent means for also actuating the stiffening mechanism.

9. A vehicle having an engine, a source of fluid pressure comprising a pressure cylinder, a piston in the cylinder operable upon variations in fluid pressure, interconnected hydraulically operated braking means and shock absorbing means and connecting means between the source of fluid pressure and the shock absorbing means.

10. A vehicle having an engine, a source of fluid pressure, a pressure cylinder, a piston in the cylinder operable upon variations of fluid pressure, interconnected hydraulically operated braking means and shock absorbing means, connecting means between the source of fluid pressure and the shock absorbing means whereby the resistance of the shock absorbing means is responsive to fluid pressure and brake applying pressure.

11. A vehicle having an engine, a source of fluid pressure, a pressure cylinder, a piston in the cylinder operable upon variations of fluid pressure, interconnected hydraulically operated braking means and shock absorbing means, connecting means between the source of fluid pressure and the shock absorbing means whereby the resistance of the shock absorbing means is responsive to fluid pressure and brake applying pressure, and manual means to vary the resistance of the shock absorbing means.

12. A vehicle having an engine, a source of pressure including a lubrication pump, a pressure cylinder, a piston in the cylinder arranged to be acted on by pressure created by the engine, fluid pressure actuated brakes, a plurality of fluid actuated shock absorbers, means whereby said shock absorbers are acted on by the pressure of the pressure side of said pump and by the pressure of the fluid pressure actuated brakes, said connecting means being operable to increase the resistance of the shock absorbers in proportion to the increase in pressure of either the lubrication pump or the fluid actuated brakes.

13. In mechanism of the class described, brakes having applying means, shock absorbers, means for varying the checking resistance of the shock absorbers, and means coupled with the brake applying means and the check resistance varying means automatically operable on actuation of the brakes to increase the checking resistance of the shock absorbers.

14. In combination with an automotive vehicle having hydraulic brakes, a motor driven pressure creating mechanism, shock absorbing mechanism operatively positioned upon said vehicle including means for stiffening the resistance thereof, a fluid pressure cylinder, a piston in said cylinder, a conduit connecting said pressure creating mechanism with said cylinder, and means connecting the piston, the hydraulic brakes and the stiffening means whereby said absorbing mechanism is stiffened in direct proportion to the speed of the motor or the extent of application of the hydraulic brakes.

15. A vehicle having an engine, driving and driven wheels, fluid pressure actuated brakes on each wheel, a source of fluid pressure including a fluid pump driven by the engine, fluid pressure actuated shock absorbers associated with each wheel, adjustable means to vary the resistance of the shock absorbers, and means connecting the adjustable means with the fluid pump and with the fluid pressure actuated brakes.

16. A vehicle having an engine, driving and driven wheels, fluid pressure actuated brakes on each wheel, a source of fluid pressure including a fluid pump driven by the engine, fluid pressure actuated shock absorbers associated with each wheel, adjustable means to vary the resistance of the shock absorbers, and means including lost motion means connecting the adjustable means with the fluid pump and with the fluid pressure actuated brakes operable to increase the resistance of the shock absorbers on the driven wheels only upon actuation of the brakes.

17. A vehicle having an engine, driving and driven wheels, fluid pressure actuated brakes on each wheel, a source of fluid pressure including a fluid pump driven by the engine, fluid pressure actuated shock absorbers associated with each wheel, adjustable means to vary the resistance of the shock absorbers, and means including lost motion means connecting the adjustable means with the fluid pump and with the fluid pressure actuated brakes operable to increase the resistance of the shock absorbers on the driving wheels only upon actuation of the brakes.

18. In a road vehicle, the combination of shock absorber resistance controlling means, brake applying and releasing mechanism, and actuator means for the resistance controlling means connected to be operated by said mechanism.

19. In a road vehicle, the combination of shock absorbers each having a resistance control means, brake applying and releasing mechanism, and connector means between the mechanism and the resistance control means, said connector means being operated by the mechanism to materially increase resistance of the shock absorbers during application of the brakes.

20. In a road vehicle, the combination with a suspension system having spring means spacing the frame and wheel supporting means vertically, of brake controlled shock absorber means restricting relative movement between the wheels and frame, said shock absorber means developing greater resistance to such relative movement during brake application.

21. In a road vehicle, the combination of shock absorber resistance controlling means, brake applying and releasing mechanism, and linkage connecting the resistance controlling means and the brake applying and releasing mechanism, said linkage operating said controlling means in response to movement of the brake applying and releasing mechanism.

22. In combination, a vehicle frame, a spring connected therewith, a wheel and axle assembly connected with the spring, a hydraulic shock absorber mounted on the frame and connected with the axle, there being a passage within the shock absorber for flow of fluid therethrough under the action of the shock absorber, a valve for closing said passage, a brake system for the vehicle, and means connecting the valve and brake system for operating the valve upon operation of the brake system.

23. A hydraulic shock absorber for a vehicle having a braking system actuated by a brake lever, comprising, in combination, means for circulating fluid within the shock absorber; fluid flow controlling means for varying the resistance offered by the shock absorber; and, means for adjusting said fluid flow controlling means to increase its restriction to the fluid flow in response to the actuation of the brake lever to apply braking forces.

ROY S. SANFORD.